US008295269B1

(12) United States Patent
Hurtta et al.

(10) Patent No.: US 8,295,269 B1
(45) Date of Patent: Oct. 23, 2012

(54) TECHNIQUE FOR INFORMING NETWORK OF VOICE TRAFFIC (75) Inventors: Tuija Hurtta, Esppo (FI); Marc Greis, Irving, TX (US)

(73) Assignee: Nokia Corporation, Espoo (FI)

( * ) Notice: Subject to any disclaimer, the term of this patent is extended or adjusted under 35 U.S.C. 154(b) by 2752 days.

(21) Appl. No.: 09/827,980

(22) Filed: Apr. 9, 2001

Related U.S. Application Data (63) Continuation-in-part of application No. 09/546,209, filed on Apr. 10, 2000, now abandoned.

(51) Int. Cl.
*H04L 12/66* (2006.01)
(52) U.S. Cl. ......... 370/352; 370/353; 370/348; 370/443
(58) Field of Classification Search .................. 370/328, 370/401, 237, 230, 395.21, 395.43, 347, 370/348, 443, 461, 462, 338, 395.3, 351–356; 455/450, 451, 62, 452.1, 452.2; 709/214, 709/226
See application file for complete search history.

(56) References Cited

U.S. PATENT DOCUMENTS

| 5,422,883 | A | 6/1995 | Hauris et al. ................ 370/62 |
|---|---|---|---|
| 5,978,368 | A | 11/1999 | Hjelm et al. ................ 370/347 |
| 6,075,985 | A * | 6/2000 | Kao .......................... 455/422.1 |
| 6,314,292 | B1 * | 11/2001 | Ho et al. ..................... 455/450 |
| 6,320,873 | B1 | 11/2001 | Nevo et al. .................. 370/466 |
| 6,374,112 | B1 | 4/2002 | Widegren et al. ........... 455/452 |
| 6,385,179 | B1 * | 5/2002 | Malcolm et al. ............ 370/329 |
| 6,434,140 | B1 | 8/2002 | Barany et al. ............... 370/352 |
| 6,463,055 | B1 * | 10/2002 | Lupien et al. ............... 370/353 |
| 6,510,174 | B1 | 1/2003 | Sexton et al. ............... 375/213 |
| 6,529,497 | B1 | 3/2003 | Hjelm et al. ................ 370/347 |
| 6,529,525 | B1 | 3/2003 | Pecen et al. ................ 370/469 |
| 6,532,227 | B1 | 3/2003 | Leppisaari et al. .......... 370/348 |
| 6,567,399 | B1 * | 5/2003 | Schuster et al. ............ 370/352 |
| 6,570,856 | B1 | 5/2003 | Freeburg et al. ........... 370/310.1 |
| 6,608,832 | B2 * | 8/2003 | Forslow ....................... 370/353 |
| 6,621,793 | B2 * | 9/2003 | Widegren et al. ........ 370/230.1 |
| 6,636,491 | B1 * | 10/2003 | Kari et al. ................... 370/328 |
| 6,636,502 | B1 * | 10/2003 | Lager et al. ................. 370/352 |
| 6,654,610 | B1 * | 11/2003 | Chen et al. .................. 455/450 |

(Continued)

FOREIGN PATENT DOCUMENTS

GB 2338150 * 9/1999

(Continued)

OTHER PUBLICATIONS

WO 00/10357, Controlling Quality of Service in a Mobile Communications System, International Publification Date: Feb. 24, 2000.*

(Continued)

*Primary Examiner* — Chuong T Ho
(74) *Attorney, Agent, or Firm* — Harrington & Smith (57) ABSTRACT

A technique for providing a voice traffic indication in a communication network includes creating a request to set up a communication session in a first network element of the network, the request including a voice traffic indication. The request is then forwarded to a second network element which detects the voice traffic indication in the forwarded request. The second network element then sets up the communication session in response to the request taking into account that voice traffic is to be transferred. The communication channel may include a PDP context. The second network element may be one of an SGSN, a GGSN, or an RNC. The first network element may include an MS.

50 Claims, 5 Drawing Sheets

U.S. PATENT DOCUMENTS

| | | | |
|---|---|---|---|
| 6,683,853 B1 * | 1/2004 | Kannas et al. | 370/237 |
| 6,707,813 B1 * | 3/2004 | Hasan et al. | 370/356 |
| 6,771,637 B1 * | 8/2004 | Suzuki et al. | 370/352 |
| 6,771,964 B1 * | 8/2004 | Einola et al. | 455/437 |
| 6,834,186 B1 | 12/2004 | Gallagher et al. | 455/411 |
| 6,904,025 B1 * | 6/2005 | Madour et al. | 370/328 |
| 6,930,994 B1 * | 8/2005 | Stubbs | 370/348 |
| 7,023,825 B1 * | 4/2006 | Haumont et al. | 370/338 |
| 7,054,945 B2 | 5/2006 | Hurtta et al. | 709/230 |
| 7,532,613 B1 * | 5/2009 | Sen et al. | 370/352 |
| 7,742,463 B2 * | 6/2010 | Lam et al. | 370/352 |
| 2001/0043577 A1 | 11/2001 | Barany et al. | 370/328 |
| 2002/0034166 A1 | 3/2002 | Barany et al. | 370/329 |
| 2002/0131395 A1 | 9/2002 | Wang | 370/349 |
| 2005/0286473 A1 * | 12/2005 | Stubbs | 370/331 |
| 2007/0041362 A1 * | 2/2007 | Lam et al. | 370/352 |

FOREIGN PATENT DOCUMENTS

| | | |
|---|---|---|
| JP | 03085838 | 4/1991 |
| JP | 03198450 | 8/1991 |
| JP | 04172745 | 6/1992 |
| JP | 10243018 | 9/1998 |
| JP | 11225169 | 8/1999 |
| JP | 2000078145 | 3/2000 |
| WO | WO 99/37103 | 7/1999 |
| WO | WO-00/10357 | 2/2000 |
| WO | WO-00/19665 | 4/2000 |

OTHER PUBLICATIONS

Call Control in the Mobile Terminal of a Wireless ATM Network; S. Martigtioni, D. Sanchez & Y.S. Wu; Proceedings 1998 International Zurich Seminar on Accessing, Transmission, Networking. Zurich. Switzerland, Feb. 17-19, 1998. IEEE 1998 pp. 135-141.

General Packet Radio Service (GPRS) Service Description, Stage 2, 3G TS 23.060, Version 3.2.1 (1999).

GSM Technical Specification 08.58 Version 5.2.0 Jul. 1996.

Draft ETSI EN 301 347 V6.8.0 (Jun. 2000); Digital cellular telecommunications systems (Phase 2+); General Packet Radio Service (GPRS); GPRS Tunnelling Protocol (GTP) Across the Gn and Gp Interface; (GSM09.60 version 6.8.0 Release 1997).

3G TS 23.228 V2.0.0 (Mar. 2001; $3^{rd}$ Generation Partnership Project; Technical Specification Group Services and Systems Aspects; IP Multimedia (IM) Subsystem—Stage 2 (3G TS 23.228 V2.0.0).

3GPP TS 23.060 V3.6.0. (Jan. 2001); $3^{rd}$ Generation Partnership Project; Technical Specification Group Services and System Aspects; General Packet Radio Service (GPRS); Service description; Stage 2 (Release 1999).

3G TS 24.008 V3.3.0 (Mar. 2000); $3^{rd}$ Generation Partnership Project; Universal Mobile Telecommunications System; Mobile radio interface layer 3 specification, Core Network Protocols—Stage 3 (Release 1999).

"$3^{rd}$ Generation Partnership Project; Technical Specification Group Services and System Aspects; Architecture Principles for Release 2000 (Release 2000)", 3G TR 23.821 V1.0.1, Jul. 2000, 62 pgs.

* cited by examiner

PRIOR ART

FIGURE 1

PRIOR ART

PRIOR ART

Legend:
3G-SGSN = Third Generation Serving GPRS Support Node
CSCF = Call State Control Function
GGSN = Gateway GPRS Support Node
GPRS = General Packet Radio Services
P-CSCF = Proxy-CSCF
PCF = Packet Control Function
PDP = Packet Data Protocol
UE = User Equipment
UMTS = Universal Mobile Telecommunications System
UTRAN = UMTS Terrestrial Radio Access Network

Figure 8

TECHNIQUE FOR INFORMING NETWORK OF VOICE TRAFFIC

CROSS-REFERENCE RELATED APPLICATIONS

The present application is a continuation-in-part of U.S. application Ser. No. 09/546,209, filed in the U.S. Patent and Trademark Office on Apr. 10, 2000 now abandoned.

BACKGROUND OF THE INVENTION

The present invention relates to mobile networks and more particularly, the present invention relates to a technique for informing a mobile network using an IP (Internet Protocol) transport mechanism of voice traffic.

In general, packet switched wireless networks provide communications for mobile terminals with no physical connection required for network access. The General Packet Radio Service (GPRS) in the Global System for Mobile communications (GSM) and the Universal Mobile Terrestrial System (UMTS) have both been developed to provide wireless communications networks with a packet switched side as well as a circuit switched side As noted in their website, http://www.3gpp.org, the Third Generation Partnership Project, normally known by their acronym 3GPP, is an organization whose Partners have agreed to cooperate in the production of globally applicable Technical Specifications and Technical Reports for a 3rd Generation Mobile System based on GSM core networks and the radial access technologies that they support (i.e., Universal Terrestrial Radio Access (UTRA) both Frequency Division Duplex (FDD) and Time Division Duplex (TDD) modes).

The 3GPP Partners have further agreed to cooperate in the maintenance and development of Global System for Mobile communication (GSM) Technical Specifications and Technical Reports including evolved radial access technologies (e.g., General Packet Radio Service (GPRS) and Enhanced Data rates for GSM Evolution (EDGE)).

The 3GPP thus issues various Technical Specifications which are then utilized by the telecommunications industry to produce mobile terminals and associated systems which have been standardized such that a mobile terminal of one manufacturer can communicate with a system or mobile terminal of another manufacturer. These Technical Specifications are constantly revised in accordance with agreements by the 3GPP Partners to allow for changes and improvements in technology.

Technical Specification TS 23.060, Version V3.6.0, was issued in January, 2001 by the 3GPP and defines the stage-2 service description for the packet domain, which includes the GPRS in GSM and UMTS. This technical specification is incorporated by reference herein in its entirety. The description of various elements and their functions incorporated by reference herein merely constitute a non-limiting example of packet switched wireless communication networks and it is to be understood that the present invention is not limited to such networks.

A network subscriber can have one or more (PDP) addresses. Each PDP address is described by one or more PDP contexts in the Mobile Station (MS), the Service GPRS Support Node (SGSN), and the Gateway GPRS Support Node (GGSN). A GGSN is a gateway to an external network. Each PDP context may have routing and mapping information for directing the transfer of data to and from its associated PDP address and a Traffic Flow Template (TFT) for reviewing or filtering the transferred data.

Each PDP context can be selectively and independently activated, modified, and deactivated. The activation state of the PDP context indicates whether data transfer is enabled for a corresponding PDP address and TFT. If all PDP contexts associated with the same PDP address are inactive or deactivated, all data transfer for that PDP address is disabled. All PDP contexts of a subscriber are associated with the same Mobility Management (MM) context for the International Mobile Subscriber Identity (IMSI) of that subscriber. Setting up a PDP context means setting up a communication channel between the MS and the GGSN.

Figure 1:
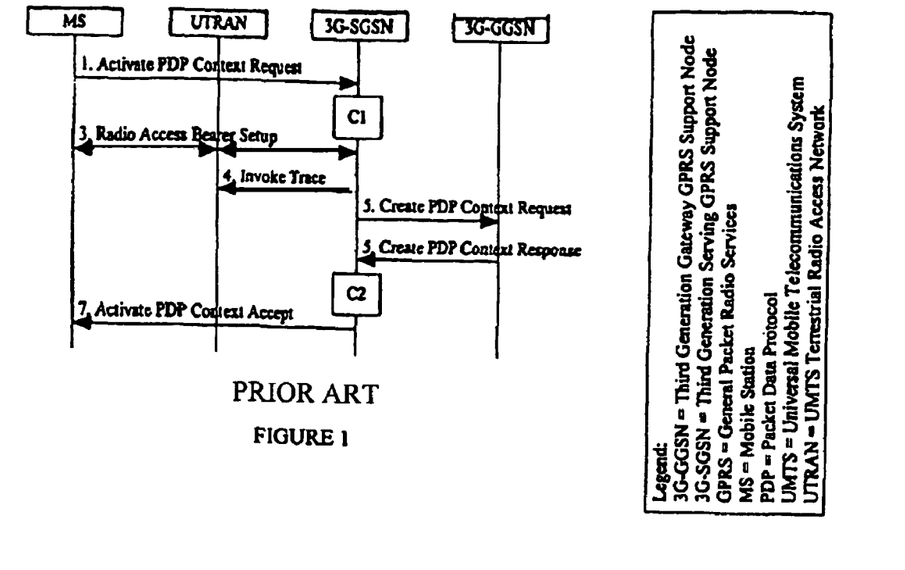
FIG. 1 illustrates the steps in a PDP context activation procedure.

FIG. 1, provided for exemplary purposes only, illustrates the PDP context activation procedure between an MS and a GGSN in a UMTS system and corresponds to FIG. 62 of the aforecited Technical Specification. The following discussion of the steps of FIG. 1 are also contained therein.

1) The MS sends an Activate PDP Context Request (NSAPI, TI, PDP Type, PDP Address, Access Point Name, QoS Requested, PDP Configuration Options) message to the SGSN. The MS shall use PDP Address to indicate whether it requires the use of a static PDP address or whether it requires the use of a dynamic PDP address. The MS shall leave PDP Address empty to request a dynamic PDP address. The MS may use Access Point Name to select a reference point to a certain external network and/or to select a service. Access Point Name is a logical name referring to the external packet data network and/or to a service that the subscriber wishes to connect to. QoS Requested indicates the desired QoS profile. PDP Configuration Options may be used to request optional PDP parameters from the GGSN (see GSM 09.60). PDP Configuration Options is sent transparently through the SGSN.

3) In UMTS, RAB setup is done by the RAB Assignment procedure, see subclause "RAB Assignment Procedure".

5) The SGSN validates the Activate PDP Context Request using PDP Type (optional), PDP Address (optional), and Access Point Name (optional) provided by the MS and the PDP context subscription records. The validation criteria, the APN selection criteria, and the mapping from APN to a GGSN are described in annex A.

If no GGSN address can be derived or if the SGSN has determined that the Activate PDP Context Request is not valid according to the rules described in annex A, then the SGSN rejects the PDP context activation request.

If a GGSN address can be derived, the SGSN creates a TEID for the requested PDP context. If the MS requests a dynamic address, then the SGSN lets a GGSN allocate the dynamic address. The SGSN may restrict the requested QoS attributes given its capabilities, the current load, and the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN. Access Point Name shall be the APN Network Identifier of the APN selected. PDP Address shall be empty if a dynamic address is requested. The GGSN may use Access Point Name to find an external network and optionally to activate a service for this APN. Selection Mode indicates whether a subscribed APN was selected, or whether a non-subscribed APN sent by MS or a non-subscribed APN chosen by SGSN was selected. Selection Mode is set. The GGSN may use Selection Mode when deciding whether to accept or reject the PDP context activation. For example, if an APN requires subscription, then the GGSN is configured to accept only the PDP context activation that requests a subscribed APN as indicated by the SGSN with Selection Mode. Charging Characteristics indicates which kind of charging the PDP context is liable for. The SGSN shall copy Charging Characteristics from Subscribed Charging Characteristics if received from the HLR. The SGSN shall include Trace Reference, Trace Type, Trigger Id, and OMC Identity if GGSN trace is activated. The SGSN shall copy Trace Reference, Trace Type, and OMC Identity from the trace information received from the HLR or OMC.

The GGSN creates a new entry in its PDP context table and generates a Charging Id. The new entry allows the GGSN to route PDP PDUs between the SGSN and the external PDP network, and to start charging. The GGSN may further restrict QoS Negotiated given its capabilities and the current load. The GGSN then returns a Create PDP Context Response (TEID, PDP Address, PDP Configuration Options, QoS Negotiated, Charging Id, Cause) message to the SGSN. PDP Address is included if the GGSN allocated a PDP address. If the GGSN has been configured by the operator to use External PDN Address Allocation for the requested APN, then PDP Address shall be set to 0.0.0.0, indicating that the PDP address shall be negotiated by the MS with the external PDN after completion of the PDP Context Activation procedure. The GGSN shall relay, modify, and monitor these negotiations as long as the PDP context is in ACTIVE state and use the GGSN-Initiated PDP Context Modification procedure to transfer the currently-used PDP address to the SGSN and the MS. PDP Configuration Options contain optional PDP parameters that the GGSN may transfer to the MS. These optional PDP parameters may be requested by the MS in the Activate PDP Context Request message, or may be sent unsolicited by the GGSN. PDP Configuration Options is sent transparently through the SGSN. The Create PDP Context messages are sent over the backbone network.

If QoS Negotiated received from the SGSN is incompatible with the PDP context being activated, then the GGSN rejects the Create PDP Context Request message. The compatible QoS profiles are configured by the GGSN operator.

7) The SGSN inserts the NSAPI along with the GGSN address in its PDP context. If the MS has requested a dynamic address, the PDP address received from the GGSN is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the MS. The SGSN is now able to route PDP PDUs between the GGSN and the MS, and to start charging.

Figure 2:
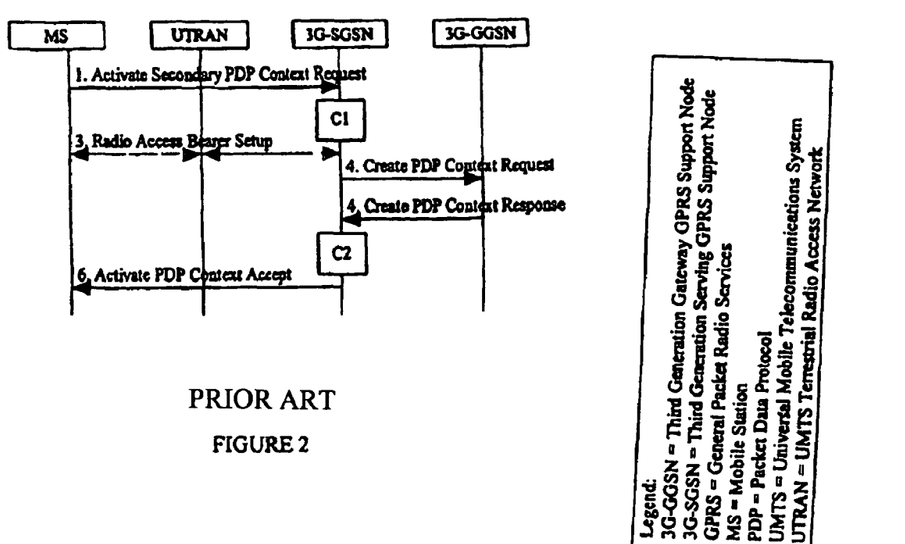
FIG. 2 illustrates the steps in a secondary PDP context activation procedure.

Similarly, FIG. 2, also provided for exemplary purposes only, illustrates the secondary PDP Context Activation procedure and corresponds to FIG. 64 of the aforecited Technical Specification. The following discussion of the steps of FIG. 2 are also contained therein.

The Secondary PDP Context Activation procedure may be used to activate a PDP context while reusing the PDP address and other PDP context information from an already active PDP context, but with a different QoS profile. Procedures for APN selection and PDP address negotiation are not executed. Each PDP context sharing the same PDP address and APN shall be identified by a unique TI and a unique NSAPI.

The Secondary PDP Context Activation procedure may be executed without providing a Traffic Flow Template (TFT) to the newly activated PDP context if all other active PDP contexts for this PDP address and APN already have an associated TFT, otherwise a TFT shall be provided. The TFT contains attributes that specify an IP header filter that is used to direct data packets received from the interconnected external packet data network to the newly activated PDP context.

1) The MS sends an Activate Secondary PDP Context Request (Linked TI, NSAPI, TI, QoS Requested, TFT) message to the SGSN. Linked TI indicates the TI value assigned to any one of the already activated PDP contexts for this PDP address and APN. QoS Requested indicates the desired QoS profile. TFT is sent transparently through the SGSN to the GGSN to enable packet classification for downlink data transfer. TI and NSAPI contain values not used by any other activated PDP context.

3) In UMTS, RAB setup is done by the RAB Assignment procedure.

4) The SGSN validates the Activate Secondary PDP Context Request using the TI indicated by Linked TI. The same GGSN address is used by the SGSN as for the already-activated PDP context(s) for that TI and PDP address.

The SGSN and GGSN may restrict and negotiate the requested QoS as specified in subclause "PDP Context Activation Procedure". The SGSN sends a Create PDP Context Request (QoS Negotiated, TEID, NSAPI, Primary NSAPI, TFT) message to the affected GGSN. Primary NSAPI indicates the NSAPI value assigned to any one of the already activated PDP contexts for this PDP address and APN. TFT is included only if received in the Activate Secondary PDP Context Request message. The GGSN uses the same external network as used by the already-activated PDP context(s) for that PDP address, generates a new entry in its PDP context table, and stores the TFT. The new entry allows the GGSN to route PDP PDUs via different GTP tunnels between the SGSN and the external PDP network. The GGSN returns a Create PDP Context Response (TEID, QoS Negotiated, Cause) message to the SGSN.

6) The SGSN selects Radio Priority and Packet Flow Id based on QoS Negotiated, and returns an Activate Secondary PDP Context Accept (TI, QoS Negotiated, Radio Priority, Packet Flow Id) message to the MS. The SGSN is now able to route PDP PDUs between the GGSN and the MS via different GTP tunnels and possibly different LLC links.

Figure 3:
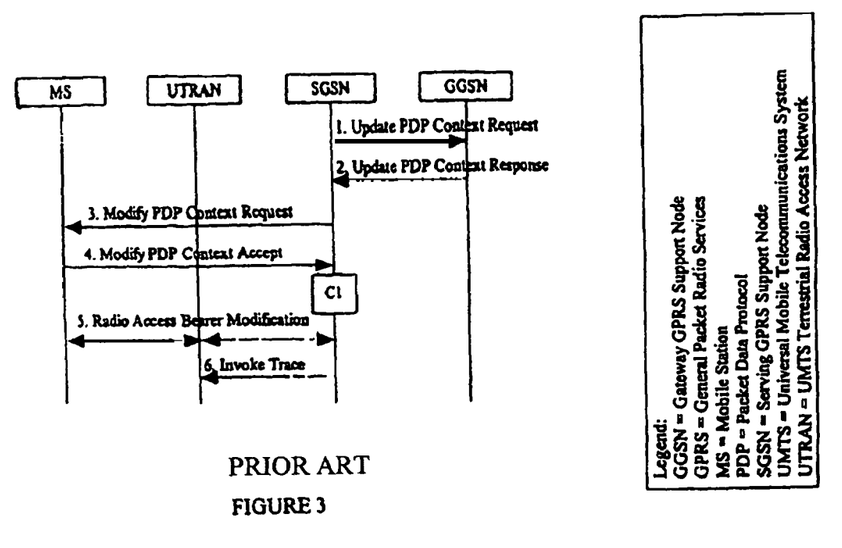
FIGS. 3-5 illustrate the steps respectively occurring in an SGSN initiated, GGSN-initiated, and MS-initiated PDP context modification procedures.

FIG. 3, also provided for exemplary purposes only, illustrates the SGSN-initiated PDP context modification procedure and corresponds to FIG. 68 of the aforecited Technical Specification. The following discussion of the steps of FIG. 3 are also contained therein.

An MS or GGSN can request, an SGSN can decide, possibly triggered by the HLR or triggered by a RAB Release procedure initiated by an RNC, or an MS and SGSN can decide after an RNC-initiated Iu release, to modify parameters that were negotiated during an activation procedure for one or several PDP contexts. The following parameters can be modified:

QoS Negotiated;
Radio Priority;
Packet Flow Id;
PDP Address (in case of the GGSN-initiated modification procedure); and
TFT (in case of MS-initiated modification procedure).

The SGSN can request the modification of parameters by sending a Modify PDP Context Request message to the MS.

A GGSN can request the modification of parameters by sending an Update PDP Context Request message to the SGSN.

An MS can request the modification of parameters by sending a Modify PDP Context Request message to the SGSN.

An RNC can request an Iu release by sending an Iu Release Request message to the SGSN. After Iu release the MS and SGSN shall modify the PDP contexts.

An RNC can request the release of a radio access bearer. After RAB release the MS and the SGSN shall locally modify the corresponding PDP context.

A trace may be activated while a PDP context is active. To enable trace activation in a GGSN, the SGSN shall send an Update PDP Context Request message to the GGSN. If PDP context modification is performed only to activate a trace, then the SGSN shall not send a Modify PDP Context Request message to the MS.

1) The SGSN may send an Update PDP Context Request (TEID, NSAPI, QoS Negotiated, Trace Reference, Trace Type, Trigger Id, OMC Identity) message to the GGSN. If QoS Negotiated received from the SGSN is incompatible with the PDP context being modified, then the GGSN rejects the Update PDP Context Request. The compatible QoS profiles are configured by the GGSN operator. The SGSN shall include Trace Reference, Trace Type, Trigger Id, and OMC Identity in the message if GGSN trace is activated while the PDP context is active. The SGSN shall copy Trace Reference, Trace Type, and OMC Identity from the trace information received from the HLR or OMC.

2) The GGSN may restrict QoS Negotiated given its capabilities and the current load. The GGSN stores QoS Negotiated and returns an Update PDP Context Response (TEID, QoS Negotiated, Cause) message.

4) The MS acknowledges by returning a Modify PDP Context Accept message. If the MS does not accept the new QoS Negotiated it shall instead de-activate the PDP context with the PDP Context Deactivation Initiated by MS procedure.

5) In UMTS, radio access bearer modification may be performed by the RAB Assignment procedure.

6) If BSS trace is activated while the PDP context is active, then the SGSN shall send an Invoke Trace (Trace Reference, Trace Type, Trigger Id, OMC Identity) message to the BSS or UTRAN. Trace Reference, and Trace Type are copied from the trace information received from the HLR or OMC.

1) The SGSN may send an Update PDP Context Request (TEID, NSAPI, QoS Negotiated, Trace Reference, Trace Type, Trigger Id, OMC Identity) message to the GGSN. If QoS Negotiated received from the SGSN is incompatible with the PDP context being modified, then the GGSN rejects the Update PDP Context Request. The compatible QoS profiles are configured by the GGSN operator. The SGSN shall include Trace Reference, Trace Type, Trigger Id, and OMC Identity in the message if GGSN trace is activated while the PDP context is active. The SGSN shall copy Trace Reference, Trace Type, and OMC Identity from the trace information received from the HLR or OMC.

2) The GGSN may restrict QoS Negotiated given its capabilities and the current load. The GGSN stores QoS Negotiated and returns an Update PDP Context Response (TEID, QoS Negotiated, Cause) message.

3) The SGSN selects Radio Priority and Packet Flow Id based on QoS Negotiated, and may send a Modify PDP Context Request (TI, QoS Negotiated, Radio Priority, Packet Flow Id) message to the MS.

4) The MS acknowledges by returning a Modify PDP Context Accept message. If the MS does not accept the new QoS Negotiated it shall instead de-activate the PDP context with the PDP Context Deactivation Initiated by MS procedure.

5) In UMTS, radio access bearer modification may be performed by the RAB Assignment procedure.

6) If BSS trace is activated while the PDP context is active, then the SGSN shall send an Invoke Trace (Trace Reference, Trace Type, Trigger Id, OMC Identity) message to the BSS or UTRAN. Trace Reference, and Trace Type are copied from the trace information received from the HLR or OMC.

Figure 4:
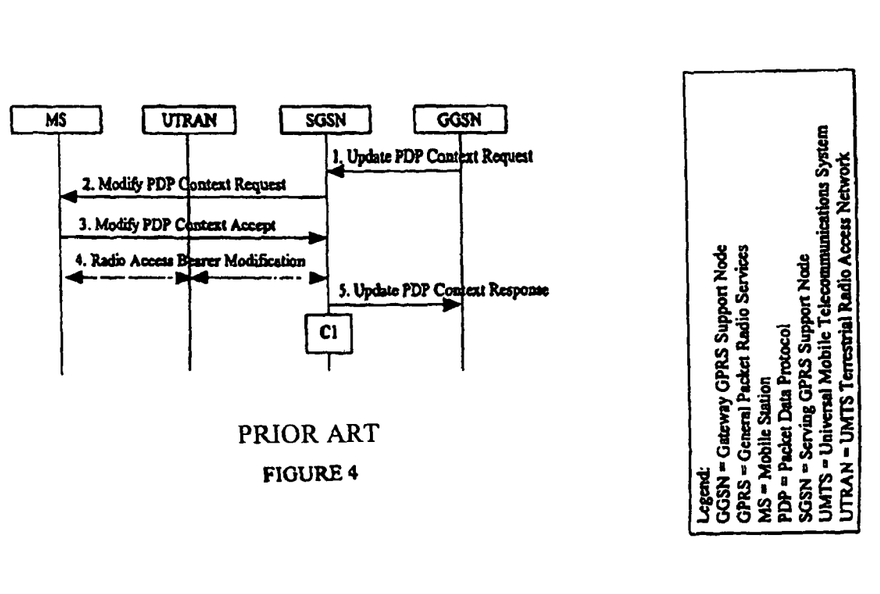

FIG. 4, also provided for exemplary purposes only, illustrates the GGSN-initiated PDP context modification procedure and corresponds to FIG. 69 of the aforecited Technical Specification. The following discussion of the steps of FIG. 4 are also contained therein.

1) The GGSN sends an Update PDP Context Request (TEID, NSAPI, PDP Address, QoS Requested) message to the SGSN. QoS Requested indicates the desired QoS profile. PDP Address is optional.

2) The SGSN may restrict the desired QoS profile given its capabilities, the current load, the current QoS profile, and the subscribed QoS profile. The SGSN selects Radio Priority and Packet Flow Id based on QoS Negotiated, and sends a Modify PDP Context Request (TI, PDP Address, QoS Negotiated, Radio Priority, Packet Flow Id) message to the MS. PDP Address is optional.

3) The MS acknowledges by returning a Modify PDP Context Accept message. If the MS does not accept the new QoS Negotiated it shall instead de-activate the PDP context with the PDP Context Deactivation Initiated by MS procedure.

4) In UMTS, radio access bearer modification may be performed by the RAB Assignment procedure.

5) Upon receipt of the Modify PDP Context Accept message, or upon completion of the RAB modification procedure, the SGSN returns an Update PDP Context Response (TEID, QoS Negotiated) message to the GGSN. If the SGSN receives a Deactivate PDP Context Request message, it shall instead follow the PDP Context Deactivation Initiated by MS procedure.

Figure 5:
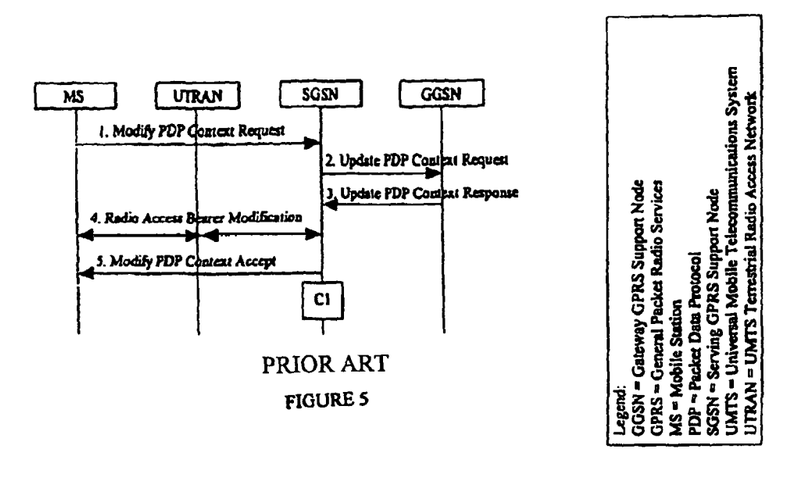

FIG. 5, also provided for exemplary purposes only, illustrates the MS-initiated PDP context modification procedure and corresponds to FIG. 70 of the aforecited Technical Specification. The following discussion of the steps of FIG. 5 are also contained therein.

1) The MS sends a Modify PDP Context Request (TI, QoS Requested, TFT) message to the SGSN. Either QoS Requested or TFT or both may be included. QoS Requested indicates the desired QoS profile, while TFT indicates the TFT that is to be added or modified or deleted from the PDP context.

2) The SGSN may restrict the desired QoS profile given its capabilities, the current load, and the subscribed QoS profile. The SGSN sends an Update PDP Context Request (TEID, NSAPI, QoS Negotiated, TFT) message to the GGSN. If QoS Negotiated and/or TFT received from the SGSN is incompatible with the PDP context being modified (e.g., TFT contains inconsistent packet filters), then the GGSN rejects the Update PDP Context Request. The compatible QoS profiles are configured by the GGSN operator.

3) The GGSN may further restrict QoS Negotiated given its capabilities and the current load. The GGSN stores QoS Negotiated, stores, modifies, or deletes TFT of that PDP context as indicated in TFT, and returns an Update PDP Context Response (TEID, QoS Negotiated) message.

4) In UMTS, radio access bearer modification may be performed by the RAB Assignment procedure.

5) The SGSN selects Radio Priority and Packet Flow Id based on QoS Negotiated, and returns a Modify PDP Context Accept (TI, QoS Negotiated, Radio Priority, Packet Flow Id) message to the MS.

NOTE: If the SGSN does not accept QoS Requested, then steps 2 and 3 of this procedure are skipped, and the existing QoS Negotiated is returned to the MS in step 4.

In spite of the numerous details provided in the aforecited Technical Specification, many features associated with mobile networks have not been dealt with. Namely, techniques for informing the network that a call being setup is for voice traffic have yet to be incorporated in the aforecited technical specification and it is these details to which the present invention is directed.

SUMMARY OF THE INVENTION

In the present invention, the signaling exchanged by the application layers in the MS and in the network is arranged in accordance with the procedure/messages that need to be performed by the transport levels in the MS and in the network in order to set up IP multimedia calls.

When the application level in the MS sends a setup message to set up an IP multimedia call, before or after sending such a message over the radio interface, the MS performs the appropriate procedures, depending on the type of access adopted, to set up the appropriate bearers over the radio interface and in the network to satisfy the call requirements specified by the application level in the setup message In setting up a call, one or more PDP contexts must be activated. In accordance with the present invention, when activating a PDP context, an indication is added to inform the network that voice traffic is to be transferred. The indication may consist of a specific parameter or even a new QoS (Quality of Service) traffic class.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following is a brief description of the drawings, wherein.

DETAILED DESCRIPTION OF THE INVENTION

Before beginning a detailed description of the subject invention, mention of the following is in order. When appropriate, like reference numerals and characters may be used to designate identical, corresponding, or similar components in differing drawing figures. Furthermore, and the detailed description to follow, example sizes/models/values/ranges may be given, although the present invention is not limited thereto. Lastly, well-known elements may not be shown within the drawing figures for simplicity of illustration and discussion and so as not to obscure the invention.

In addition to the aforecited Technical Specification, Technical Specification TS 23.228, Version V2.0.0, issued by the 3GPP in March, 2001, defines the stage-2 service description for the IP Multimedia (IM) Subsystem, which includes the elements necessary to support IP Multimedia (IM) services in UMTS. This technical specification is incorporated by reference herein in its entirety and, as in the case of the previously cited Technical Specification, the elements and their functions incorporated by reference herein are merely a non-limiting example of packet switched wireless communication networks and the present invention should not be construed as being limited thereto.

Figure 8:
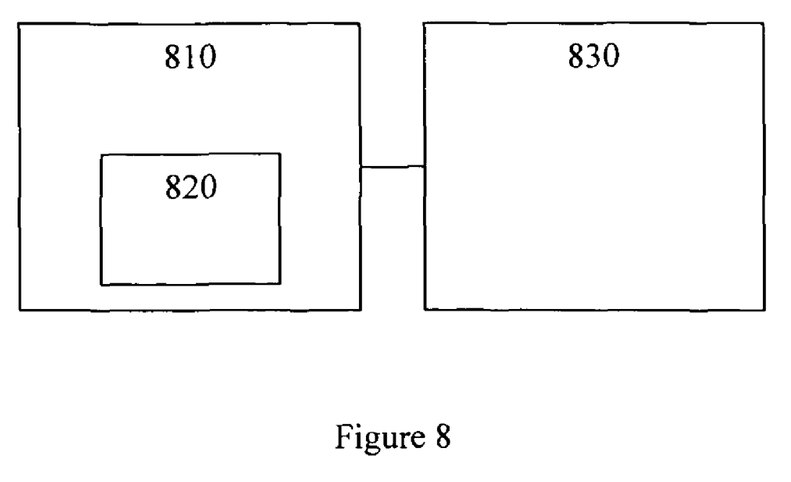
FIG. 8 illustrates a simplified block diagram of exemplary electronic devices that are suitable for use in practicing various exemplary embodiments of this invention.

FIG. 8 illustrates a simplified block diagram of exemplary electronic devices that are suitable for use in practicing various exemplary embodiments of this invention. A program storage device 810 readable by a machine 830, tangibly embodying a program 820 of instructions executable by the machine 830 to perform a method of providing a voice traffic indication in a communications network in accordance with this invention.

Figure 6:
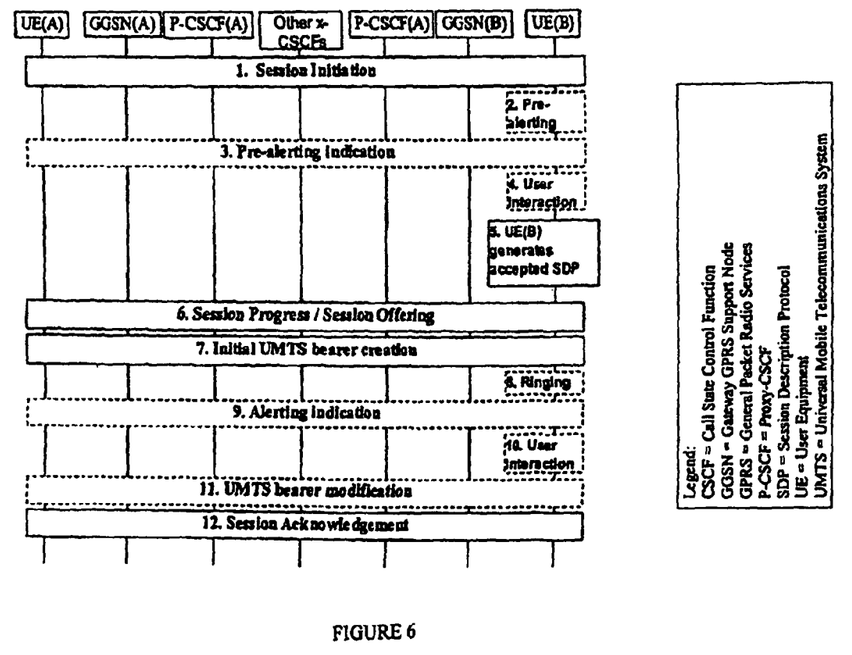
FIG. 6 illustrates the steps occurring in a call setup procedure.

FIG. 6, which corresponds to FIG. 5.7 of the TS 23.228 Technical Specification, illustrates the steps occurring in a call setup procedure.

1. UE(A) starts a Session Initiation procedure to UE(B) that includes an SDP proposal.

2. The user at UE(B) is pre-alerted. (optional)

3. An indication of the pre-alerting may be sent towards UE(A). (optional)

4. User at UE(B) will then interact and express his/her wishes regarding the actual session. (optional)

5. UE(B) generates accepted SDP based on terminal settings, terminal preconfigured profiles and, optionally, the user's wishes.

6. The accepted SDP is forwarded to UE(A) in the payload of a reliable SIP response.

7. Initial bearer creation procedure is performed. During this bearer creation step, the resources in the UE(A)'s and UE(B)'s access network are reserved possibly with PDP context procedures. Bearer resources in eternal networks may also be reserved at this point.

8. Terminal at UE(B) starts ringing. (optional)

9. The alerting indication is sent towards UE(A). (optional)

10. User at UE(B) may interact and express his/her wishes regarding the actual session. (optional)

11. UE(A) and UE(B) may perform bearer modification procedure at this point if the initial bearers reserved in step 7 and the wishes of user at UE(B) are different. During this bearer modification step, the resources in the UE(A)'s and UE(B)'s access network may be modified by modifying the PDP context, and the resource reservation in the external network may also be modified.

12. Session initiation procedure is acknowledged.

It is well-known that voice traffic has very specific statistical characteristics. Normally, the bandwidth required for transferring voice traffic is less than that required for transferring data. Accordingly, when the GGSN, SGSN, or RNC make a determination as to whether a new PDP context can be admitted, is of course understood that they can admit more PDP contexts for use with voice traffic as compared with data. This allows for the more efficient use of available resources.

In addition to the aforementioned Technical Specifications, Technical Report TR 23.821, Version V1.0.0, issued by the 3GPP in June, 2000, includes an additional QoS parameter as a speech indication in Section 10.3 thereof. This Technical Report is incorporated herein in its entirety and, as with the previously cited Technical Specifications, the elements and their functions incorporated by reference herein are merely a non-limiting example of packet switched wireless communication networks and the present invention should not be construed as being limited thereto.

While the speech indication described in the Technical Report cited above provides an indication of voice traffic, for the SGSN, for example, to be informed of the transfer of voice traffic, it is necessary to also provide the voice traffic indication in the PDP context activation or modification, (that is, also in the UMTS Bearer Service attributes where it is currently not included).

Thus, in accordance with the present invention, the activate PDP Context Request message or Active Secondary PDP Context Request Message or Modify PDP context Request message, forwarded from the MS to the SGSN and then to the GGSN, for example, includes a voice traffic parameter which informs the SGSN and the GGSN that voice traffic is to be transferred.

Figure 7:
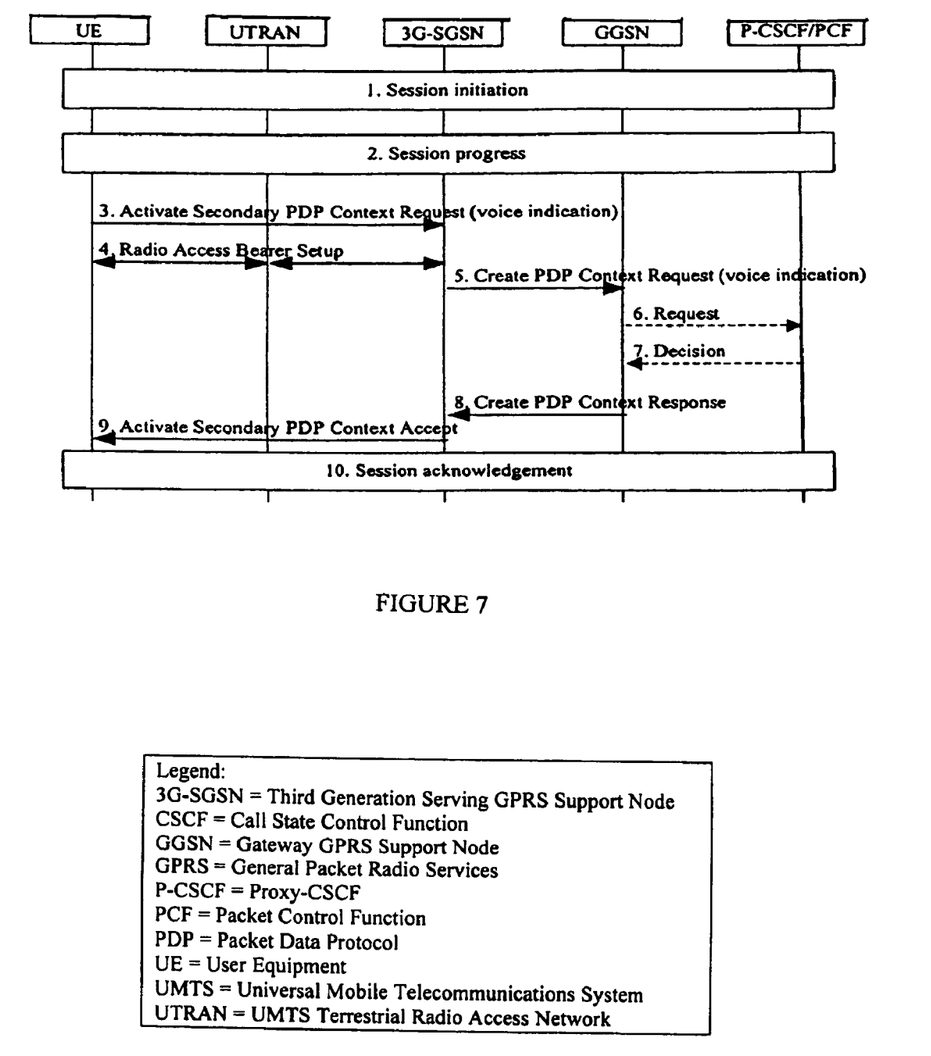
FIG. 7 illustrates an example of a call setup procedure in accordance with the present invention.

FIG. 7 illustrates in detail an example of the steps occurring in a call setup procedure in accordance with the present invention. As illustrated therein, steps 1 and 2 essentially correspond to the steps 1-3 of the previous drawing figure.

In step 3, an Activate Secondary PDP Context Request message, for example, is forwarded to the SGSN to provide an indication that voice traffic is to be transferred. In step 4, a Radio Access Bearer Setup is arranged between the SGSN and the UE (that is, the MS). In step 5, a Create PDP Context Request message is forwarded from the SGSN to the GGSN to provide an indication that voice traffic is to be transferred. In steps 6 and 7, the GGSN forwards a Request message to the CSCF which in turn forwards a Decision message back to the GGSN. In step 8, in response to the Decision message from the CSCF, the GGSN forwards a Create PDP Context Response to the SGSN and in step 9, the SGSN forwards an Activate Secondary PDP Context Accept to the UE. Lastly, in step 10, the session initiation procedure is acknowledged.

Thus, in accordance with the present invention, a voice traffic indication is added when activating one or more PDP contexts. This indication may be added to the Activate PDP Context Request or the Activate Secondary PDP Context Request or the Modify PDP Context Request messages. The indication could be, for example, a new value for an existing parameter, a new parameter or even a new QoS traffic class.

By adding a voice traffic indication to one or more PDP contexts, the present invention solves a problem not previously addressed, namely, that the network elements in a GPRS network may need to know that a PDP context is used to transfer traffic related to a call.

For example, the GGSN already sends Charging Id at PDP Context Activation to the SGSN. When the PDP context is used for a call (that is, voice traffic), the GGSN may send Charging Id to the CSCF in order to enable charging coordination between the GPRS layer and the IP Telephony layer. The GGSN does not need to send the charging Id to the CSCF when a PDP context is activated for other purposes.

As another example, prepaid services for a call may be based on communication between the CSCF and the SCP only. The SGSN should not communicate with the SCP if a PDP context is used for a call. The SGSN may communicate with the SCP if a PDP context is activated for other purposes. The communication between the SGSN and the SCP on PDP context is already specified in CAMEL Rel 99, for example.

Still furthermore, coordination of the QoS between the GPRS layer and the IP Telephony layer has been discussed.

This would mean that an accepted call may influence the QoS of the PDP context that is activated for the call. That is, if a normal call is accepted in the IP Telephony layer, it should not be possible to activate a PDP context capable of carrying a video call. For a PDP context used for other purposes, this kind of coordination is not needed.

In addition, by the addition of the voice traffic indication to one or more PDP contexts, the GGSN may use this voice traffic indication to determine whether or not a bearer authorization in PCF needs to be done.

A further exemplary embodiment in accordance with this invention is a program storage device readable by a machine, tangibly embodying a program of instructions executable by the machine to perform a method of providing a voice traffic indication in a communications network, the method comprising: setting up a communications session between a first network element and a first network; creating a request to set up a communication session in the first network element in order to establish a bearer on a second network for said session, including a voice traffic indication in said request; and forwarding the request to a second network element in the second network.

Another exemplary embodiment in accordance with this invention is a program storage device readable by a machine, tangibly embodying a program of instructions executable by the machine to perform a method of providing a voice traffic indication in a communications network, the method comprising: setting up a communications session between a first network element and a first network; creating a request to modify a communication session in the first network element in order to establish a bearer on a second network for said session, including a voice traffic indication in said request; and forwarding the request to a second network element in the second network.

This concludes the description of the example embodiments. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will be apparent to those skilled in the art.

What is claimed is:

1. A method, comprising:

setting up a communication session between a first network element and a first network, where the first network is a first packet switched network;

creating a request to set up a communication channel in the first network element in order to establish a bearer on a second network for said communication session, where the second network is a second, different packet switched network;

including a voice traffic indication in said request, said voice traffic indication represented by a parameter in the request and said voice traffic indication indicating that the communication channel is to be used only for voice traffic;

forwarding the request from the first network element to a second network element in said second network; and receiving a message indicating whether the request has been admitted based on statistical characteristics of voice traffic.

2. The method of claim 1, further comprising: forwarding the voice indication to a third network element in the second network from the second network element in the second network.

3. The method of claim 1, where the communication channel comprises a packet data protocol context.

4. The method of claim 1, where the communication session comprises an interne protocol multimedia subsystem session.

5. The method of claim 1, where the first network comprises an internet protocol multimedia subsystem network.

6. The method of claim 1, where the second network comprises a core network.

7. The method of claim 1, where the second network comprising a radio access network.

8. The method of claim 1, where the second network element in the second network comprises a serving general packet radio service support node.

9. The method of claim 1, where the third network element in the second network comprises a gateway general packet radio service support node.

10. The method of claim 1, where the second network element comprises a radio network controller.

11. The method of claim 1, where the first network element comprises a mobile station.

12. The method of claim 1, where the second network element in the second network comprises a serving general packet radio service support node coupled to a gateway general packet radio service support node.

13. A method, comprising:
setting up a communication session between a first network element and a first network, where the first network is a first packet switched network;
creating a request to modify a communication channel setting in order to establish a bearer on a second network for the communication session, where the second network is a second, different packet switched network;
including a voice traffic indication in said request, said voice traffic indication represented by a parameter in the request and said voice traffic indication indicating that the communication channel is to be used only for voice traffic;
forwarding the request from the first network element to a second network element in the second network; and
receiving a message indicating whether the request has been admitted based on statistical characteristics of voice traffic.

14. A system, comprising:
a setup unit configured to set up a communication session between a first network element and a first network, where the first network is a first packet switched network;
a request unit configured to create a request to set up a communication channel in the first network element in order to establish a bearer on a second network for said communication session and to include a voice traffic indication in said request,
where the second network is a second, different packet switched network,
said voice traffic indication represented by a parameter in the request and said voice traffic indication indicating that the communication channel is to be used only for voice traffic; and a forwarder unit configured to forward the request from the first network element to a second network element in said second network,
where the system is further configured to receive a message indicating whether the request has been admitted based on statistical characteristics of voice traffic.

15. The system of claim 14, further comprising: a second forwarder unit configured to forward the voice indication to a third network element in the second network from the second network element in the second network.

16. The system of claim 15, further comprising: a detector configured to detect the voice traffic indication in the forwarded request by the third network element in the second network.

17. The system of claim 15, wherein the forwarded voice indication is included in admission control of bearers in the third network element in the second network.

18. The system of claim 14, further comprising: a detector configured to detect the voice traffic indication in the forwarded request by the second network element in the second network.

19. The system according to claim 14, further comprising: a second setup unit configured to set up the communication session by the second network element in the second network in response to said request.

20. The system of claim 14, wherein the forwarded voice indication is included in admission control of bearers in the second network element in the second network.

21. An apparatus, comprising:
a receiver configured to receive a request to set up a communication channel communicating in a session of a first network in order to establish a bearer on a second network for said session, where the first network is a first packet switched network and the second network is a second, different packet switched network; and
a detector configured to detect that the requested bearer establishment is for voice traffic, said requested bearer establishment including a voice traffic indication represented by a parameter and said voice traffic indication indicating that the communication channel is to be used only for voice traffic,
where the apparatus is configured to determine whether to admit said request based on statistical characteristics of voice traffic and to send a decision message indicating whether the request has been admitted,
wherein the apparatus is configured to be contained within the second network.

22. The apparatus of claim 21, wherein the detector comprises one of a radio network controller, a gateway general packet radio service support node, and a serving general packet radio service support node.

23. A system, comprising:
setup means for setting up a communication session between a first network element and a first network, where the first network is a first packet switched network;
creation means for creating a request to set up a communication channel in the first network element in order to establish a bearer on a second network for said communication session, where the second network is a second, different packet switched network, and for including a voice traffic indication in said request, said voice traffic indication represented by a parameter in the request and said voice traffic indication indicating that the communication channel is to be used-only for voice traffic;

forwarder means for forwarding the request from the first network element to a second network element in said second network; and means for receiving a message indicating whether the request has been admitted based on statistical characteristics of voice traffic.

24. An apparatus, comprising:

receiving means for receiving a request to set up a communication channel in a first network element communicating in a session of a first network in order to establish a bearer on a second network for said session, where the first network is a first packet switched network and the second network is a second, different packet switched network;

detecting means for detecting that the requested bearer establishment is for voice traffic, said requested bearer establishment including a voice traffic indication represented by a parameter and said voice traffic indication indicating that the communication channel is to be used only for voice traffic;

means for determining whether to admit said request based on statistical characteristics of voice traffic and means for sending a decision message indicating whether the request has been admitted.

25. An apparatus, comprising:

a setting up unit configured to set up a communication session between a first network element and a first network, where the first network is a first packet switched network;

a creating unit configured to create a request to set up a communication channel in the first network element in order to establish a bearer on a second network for said communication session, where the second network is a second, different packet switched network;

a voice traffic indicator unit configured to include a voice traffic indication in said request, said voice traffic indication represented by a parameter in the request and said voice traffic indication indicating that the communication channel is to be used only for voice traffic; and a forwarding unit configured to forward the request from the first network element to a second network element in said second network, where the apparatus is configured to receive a message indicating whether the request has been admitted based on statistical characteristics of voice traffic.

26. The apparatus of claim 25, further comprising: another forwarding unit forwarder configured to forward the voice indication to a third network element in the second network from the second network element in the second network.

27. The apparatus of claim 26, further comprising: a detector configured to detect the voice traffic indication in the forwarded request by the third network element in the second network.

28. The apparatus of claim 26, further comprising: an including unit configured to include the forwarded voice indication in admission control of bearers in the third network element in the second network.

29. The apparatus of claim 25, further comprising: a detector configured to detect the voice traffic indication in the forwarded request by the second network element in the second network.

30. The apparatus of claim 25, further comprising: a setting up unit configured to set up the communication channel by the second network element in the second network in response to said request.

31. The apparatus of claim 25, further comprising: an including unit configured to include a forwarded voice indication in admission control of bearers in the second network element in the second network.

32. The apparatus of claim 25, further comprising: a configuring unit to configure the communication channel to comprise a packet data protocol context.

33. The apparatus of claim 25, further comprising:

a configuring unit to configure the communication session to comprise an internet protocol multimedia subsystem session.

34. The apparatus of claim 25, further comprising: a configuring unit to configure the first network to comprise an internet protocol multimedia subsystem network.

35. The apparatus of claim 25, further comprising: a configuring unit to configure the second network to comprise a core network.

36. The apparatus of claim 25, further comprising: a configuring unit to configure the second network to comprise a radio access network.

37. The apparatus of claim 25, further comprising: a configuring unit to configure the second network element in the second network to comprise a serving general packet radio service support node.

38. The apparatus of claim 25, further comprising: a configuring unit to configure the third network element in the second network to comprise a gateway general packet radio service support node.

39. The apparatus of claim 25, further comprising: a configuring unit to configure the second network element to comprise a radio network controller.

40. The apparatus of claim 25, further comprising: a configuring unit to configure the first network element to comprise a mobile station.

41. The apparatus of claim 25, further comprising: a configuring unit to configure the second network element in the second network to comprise a serving general packet radio service support node coupled to a gateway general packet radio service support node.

42. An apparatus, comprising:

means for setting up a communication session between a first network element and a first network, where the first network is a first packet switched network;

means for creating a request to set up a communication channel in the first network element in order to establish a bearer on a second network for said communication session, where the second network is a second, different packet switched network;

means for including a voice traffic indication in said request, said voice traffic indication represented by a parameter in the request and said voice traffic indication indicating that the communication channel is to be used only for voice traffic;

means for forwarding the request from the first network element to a second network element in said second network; and means for receiving a message indicating whether the request has been admitted based on statistical characteristics of voice traffic.

43. The apparatus of claim 42, wherein the apparatus is configured for a terminal in a communication network.

44. An apparatus, comprising:

a setting up unit configured to set up a communication session between a first network element and a first network, where the first network is a first packet switched network;

a creating unit configured to create a request to modify a communication channel setting in order to establish a bearer on a second network for the communication session, where the second network is a second, different packet switched network, and configured to include a voice traffic indication in said request, said voice traffic indication represented by a parameter in the request and said voice traffic indication indicating that the communication channel is to be used only for voice traffic; and a forwarding unit configured to forward the request from the first network element to a second network element in the second network, where the apparatus is configured to receive a message indicating whether the request has been admitted based on statistical characteristics of voice traffic.

45. An apparatus, comprising:

setting up means for setting up a communication session between a first network element and a first network, where the first network is a first packet switched network;

creating means for creating a request to modify a communication channel setting in order to establish a bearer on a second network for the communication session, where the second network is a second, different packet switched network, and for including a voice traffic indication in said request, said voice traffic indication represented by a data or signaling parameter in the request and said voice traffic indication indicating that the communication channel is to be used only for voice traffic;

forwarding means for forwarding the request from the first network element to a second network element in the second network; and means for receiving a message indicating whether the request has been admitted based on statistical characteristics of voice traffic.

46. A method comprising:

receiving, at a network element of a second network, a forwarded request to set up a communication channel communicating in a session of a first network in order to establish a bearer on the second network for said session, where the first network is a first packet switched network and the second network is a second, different packet switched network;

detecting whether the requested bearer establishment is for voice traffic only by determining whether said requested bearer establishment comprises a voice traffic indication, where the voice traffic indication is represented by a parameter;

determining whether to admit said request based on statistical characteristics of voice traffic; and sending a decision message indicating whether the request has been admitted.

47. The method of claim 46, further comprising, in response to receiving said request, setting up the communication channel configured for voice traffic in the second network.

48. The method of claim 46, further comprising, including the voice indication in admission control of bearers in the second network element in the second network.

49. A non-transitory program storage device readable by a machine, tangibly embodying a program of instructions executable by the machine to perform actions comprising:

setting up a communication session between a first network element and a first network, where the first network is a first packet switched network;

creating a request to set up a communication session in the first network element in order to establish a bearer on a second network for said communication session, where the second network is a second, different packet switched network;

including a voice traffic indication in said request, said voice traffic indication represented by a parameter in the request and said voice traffic indication indicating that the communication channel is to be used only for voice traffic;

forwarding the request from the first network element to a second network element in the second network; and receiving a message indicating whether the request has been admitted based on statistical characteristics of voice traffic.

50. A non-transitory program storage device readable by a machine, tangibly embodying a program of instructions executable by the machine to perform actions comprising:

setting up a communication session between a first network element and a first network, where the first network is a first packet switched network;

creating a request to modify a communication session in the first network element in order to establish a bearer on a second network for said communication session, where the second network is a second, different packet switched network;

including a voice traffic indication in said request, said voice traffic indication represented by a parameter in the request and said voice traffic indication indicating that the communication channel is to be used only for voice traffic;

forwarding the request from the first network element to a second network element in the second network; and receiving a message indicating whether the request has been admitted based on statistical characteristics of voice traffic.

* * * * *

UNITED STATES PATENT AND TRADEMARK OFFICE
CERTIFICATE OF CORRECTION

Page 1 of 1

PATENT NO.         : 8,295,269 B1
APPLICATION NO.    : 09/827980
DATED              : October 23, 2012
INVENTOR(S)        : Hurtta et al.

It is certified that error appears in the above-identified patent and that said Letters Patent is hereby corrected as shown below:

Claim 4, col. 11, line 11 delete "interne" and insert --internet--.

Claim 45, col. 15, line 25 delete "data or signaling".

Signed and Sealed this
First Day of January, 2013

David J. Kappos
*Director of the United States Patent and Trademark Office*